F. G. LOGSDON.
WEEDING IMPLEMENT.
APPLICATION FILED NOV. 2, 1916.
1,253,504.
Patented Jan. 15, 1918.
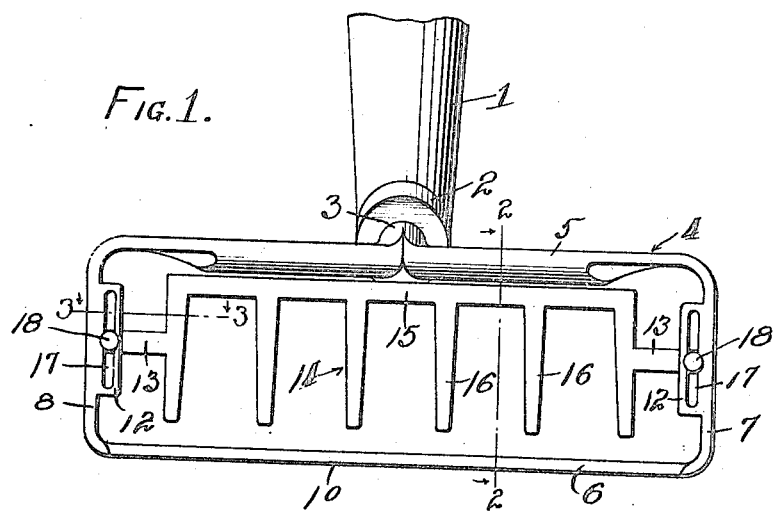
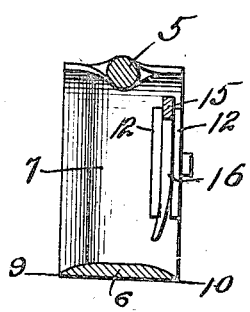
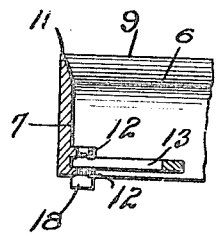
WITNESSES
INVENTOR
FREDERICK G. LOGSDON
ATTORNEY

UNITED STATES PATENT OFFICE.

FREDERICK G. LOGSDON, OF DAVENPORT, WASHINGTON.

WEEDING IMPLEMENT.

1,253,504.   Specification of Letters Patent.   Patented Jan. 15, 1918.

Application filed November 2, 1916. Serial No. 129,200.

*To all whom it may concern:*

Be it known that I, FREDERICK G. LOGSDON, a citizen of the United States, residing at Davenport, in the county of Lincoln and State of Washington, have invented certain new and useful Improvements in Weeding Implements, of which the following is a specification.

This invention relates to a weeding implement and more particularly to a combination hoe and rake adapted to cut the weeds from the ground and rake the same into a pile without gathering earth when the raking process is being carried out.

One of the objects of the invention is to provide an implement of this character having a blade adapted to lie flat upon the ground for severing weeds and provided with a vertically adjustable rake element having tines with their ends disposed in spaced relation to one of the cutting edges of the blade.

As a further object of the invention the implement is provided with a substantially rectangular frame, one side of which is provided with sharpened edges for acting as a cutting element or a hoe, while the frame also carries a rake member adjustably mounted and adapted to move toward or away from the said cutting blade.

A further object this invention is the provision of a weeding implement which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which, Figure 1 is a front elevation.

Fig. 2 is a vertical transverse section on the line 2—2 of Fig. 1.

Fig. 3 is a fragmentary section on the line 3—3 of Fig. 1.

Referring to the drawing, wherein is illustrated the preferred form of my invention, and in which like numerals of reference indicate corresponding parts throughout the several views, the handle 1 of the implement is provided with a ferrule 2 and the handle is fastened to the tongue 3 which forms a part of the frame 4. The frame 4 is substantially rectangular in formation comprising the upper and lower bars 5 and 6 and the vertical end bars 7 and 8. The upper bar 5, to which the tongue 3 is connected, is cylindrical in formation and its ends are flattened and spread out to provide the flat bars 7 and 8 which are bent from the ends of the upper bar 5 at right angles thereto and are integrally connected at their opposite ends, to the lower bar 6. Thus the bottom bar 6 and the two end bars 7 and 8 are of flat rectangular formation while the upper bar 5 is substantially cylindrical. Each of the longitudinal edges of the bar 6 are sharpened thereby providing the cutting edges 9 and 10 for severing weeds and other objectionable vegetation. The rearward edge of the end bar 7 is also sharpened for permitting the cutting edge 11 whereby the frame may be turned on either end for severing weeds in places where the space is narrow and limited.

Integrally formed with each of the end bars 7 and extending inwardly of the frame are the flanges 12 of a length slightly less than the length of the end bar. As shown by Fig. 3 of the drawing, these flanges 12 are formed in pairs on each end bar 7 and 8 and spaced apart for providing a groove for receiving the retaining arms 13 of the rake element 14. The rake comprises the tooth carrying bar 15 having the tines 16 integrally formed therewith and extending downwardly, their lower ends being slightly curved rearwardly as shown by Fig. 2 of the drawing. The retaining arms 13, at each end of the rake element, are integrally formed with the end tines intermediate the ends thereof. Each flange 12 is provided with a longitudinal slot 17 for receiving a thumb-screw 18 adapted to extend through the slot in the outermost flange of each pair and in registration with an opening formed in the end of each retaining arm 13.

This construction, it will be observed, permits the rake element 14 to be disposed vertically at the forward edge of the train 4 and the tooth carrying bar 15 is free to move upwardly above the cylindrical bar 5 by virtue of the fact that the bar 5 is disclosed rearwardly of the rake element as shown by Fig. 2 of the drawing. The sleeves 17, therefore, permit the rake element 14 to be adjusted to a variety of heights or distances from the lower bar 6 which, by reason of its two cutting edges 9 and 10 forms a cutting blade for the device. The rake element may be raised to a height sufficient to permit the weeds to pass freely through the frame when they are severed by the cutting blade thereby leaving the weeds wherever they may be deposited. By lowering the rake element so that the tines come in close proximity to the cutting blade, the weeds will be drawn along the ground when the implement is in operation and the severed weeds may be gathered into a pile, the rake obviating the possibility of dirt and earth accumulating.

The weeds which closely gather around the base of a plant may be severed without danger to the stalk of the plant by raising the rake element and forcing the forward cutting edge 10 into engagement with the weeds, using a forward thrust on the implement and stopping the same before it touches the stalk of the plant. The cutting edges 11 on each of the end bars 7 and 8 may be employed where the space between the plants is narrow and restricted.

From the foregoing it will be observed that a very simple and durable weeding implement has been provided, the details of which embody the preferred form. I desire it to be understood however, that slight changes in the minor details of construction may be made without departing from the spirit of the invention or the scope of the claims hereunto appended.

I claim:

1. A weeding implement comprising, in combination, a rectangular frame having upper and lower bars, a rake element disposed directly above one edge of the said lower bar, and means for permitting vertical adjustment of the said rake element above and below the said upper bar.

2. A weeding implement comprising, in combination, a rectangular frame having two cutting edges formed on one longitudinal side thereof, a rake element, means for supporting the said rake element above one of the said cutting edges, and means for permitting the ends of the tines of the rake element to be adjusted within the frame, the edge of one of the side bars of the frame permitting the rake element to extend above the same.

3. A weeding implement comprising, in combination, a rectangular frame having upper and lower bars, the lower bar being provided with cutting edges, an upper bar relatively narrower than the lower bar, a rake element carried by the frame, and means supporting the said rake element and permitting adjustment of the said rake element above and below the said upper bar.

4. A weeding implement comprising, in combination, a rectangular frame, flanges carried by the ends of the frame and provided with elongated slots, a rake element, retaining arms carried by the rake element and connected to the flanges through the medium of the said slots whereby adjustment of the said rake element is permitted, one of the bars of the frame being relatively narrow for permitting a portion of the rake element to extend above the said narrow bar.

5. A weeding implement comprising, in combination, a frame having one of its longitudinal sides provided with cutting edges and its opposite side formed by a relatively narrow bar, the forward edges of each end portion of the frame being provided with flanges, a rake element, means connecting the said rake element with the flanges, the width of the said end portions of the frame with respect to the said upper narrow bar permitting movement of the said rake element above the said narrow bar.

6. A weeding implement comprising, in combination, a rectangular frame having upper and lower bars, the lower bar being provided with cutting edges, the upper bar being relatively narrower than the lower bar, a rake element disposed directly above one of the said cutting edges and vertically adjustable above and below the upper bar.

7. A weeding implement comprising a frame having end vertical bars, each provided with flanges extending laterally into the frame and each provided with a slot, a rake element having retaining arms, the latter being adjustably connected to the said flanges through the said slots.

8. A weeding implement comprising a frame having end vertical bars, each provided with flanges extending laterally into the frame and each provided with a slot, a rake element having retaining arms, the latter being adjustably connected to the said flanges through the said slots, the said flanges being disposed at the edge of the vertical bars, whereby the said rake element may be moved above the top of the said frame.

In testimony whereof I affix my signature in presence of two witnesses.

FREDERICK G. LOGSDON.

Witnesses:
F. K. P. BASKE,
M. E. JESSEPH.

Copies of this patent may be obtained for five cents each, by addressing the "Commissioner of Patents, Washington, D. C."